Figure 1:
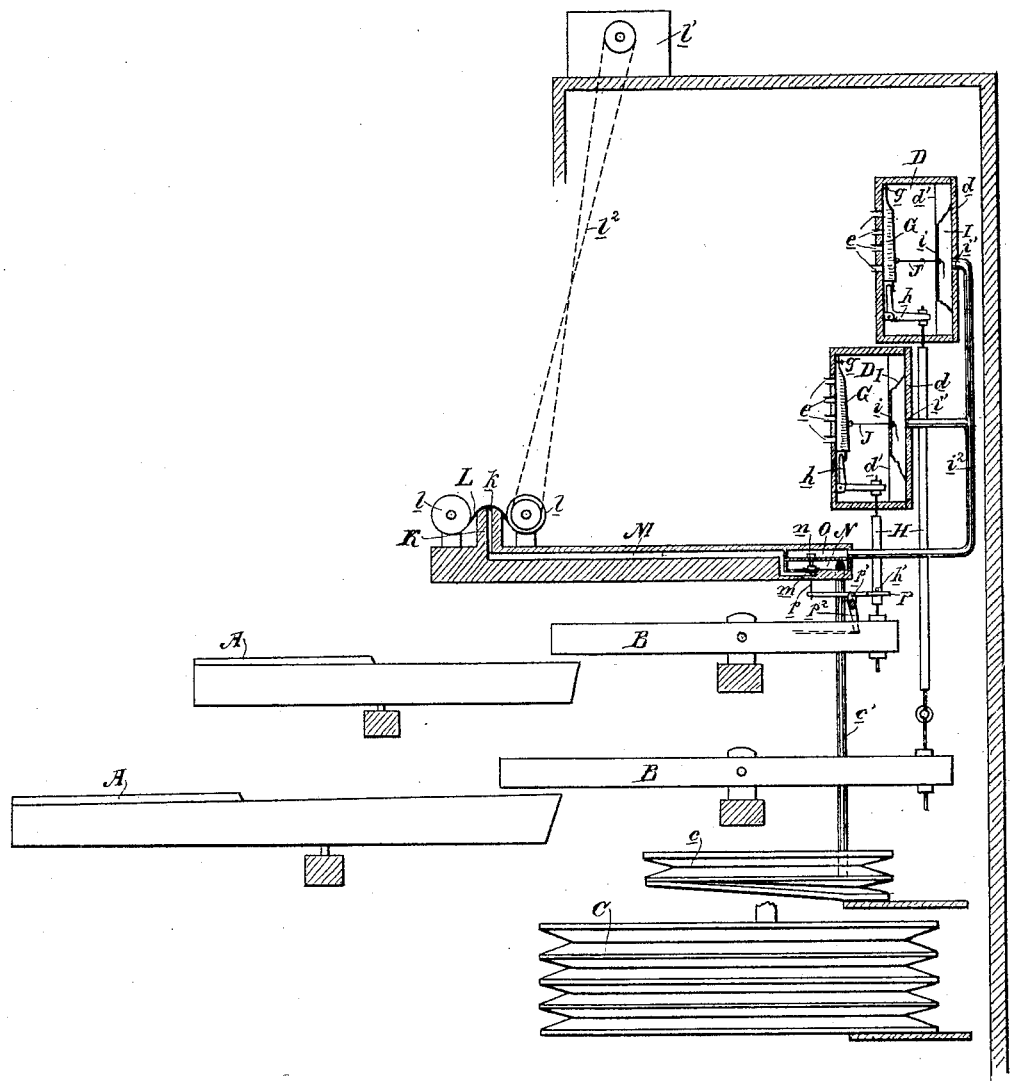

(No Model.) 3 Sheets—Sheet 1.
G. F. WELLS.
AUTOMATIC ORGAN.

No. 462,460. Patented Nov. 3, 1891.

Witnesses:
Inventor,
George F. Wells
By Dewey & Co.
attys (No Model.) 3 Sheets—Sheet 2.
G. F. WELLS.
AUTOMATIC ORGAN.
No. 462,460. Patented Nov. 3, 1891.
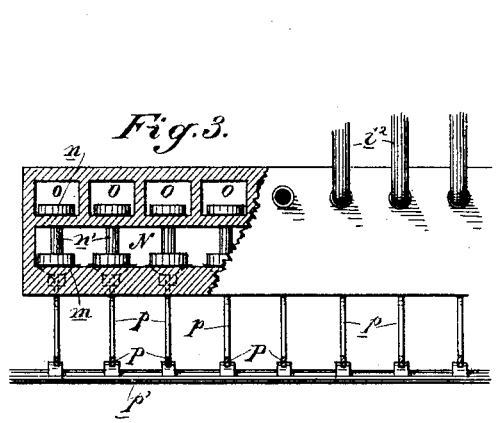
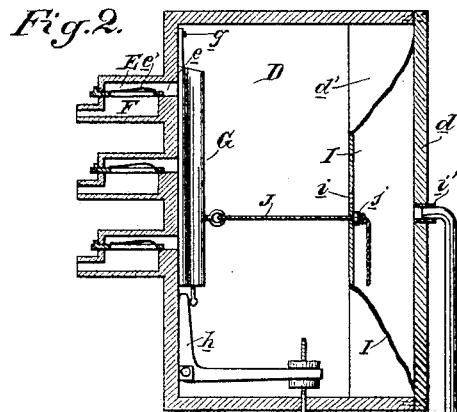
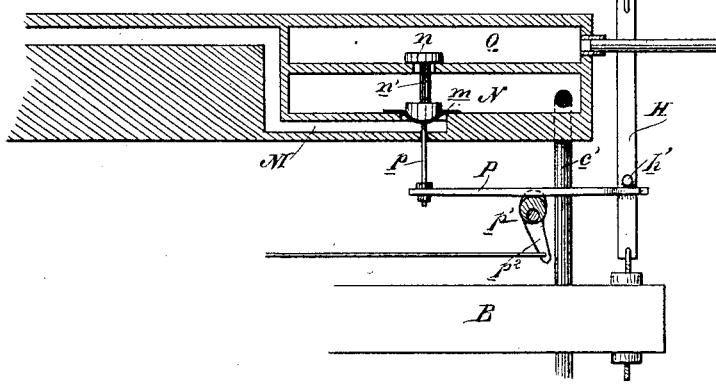
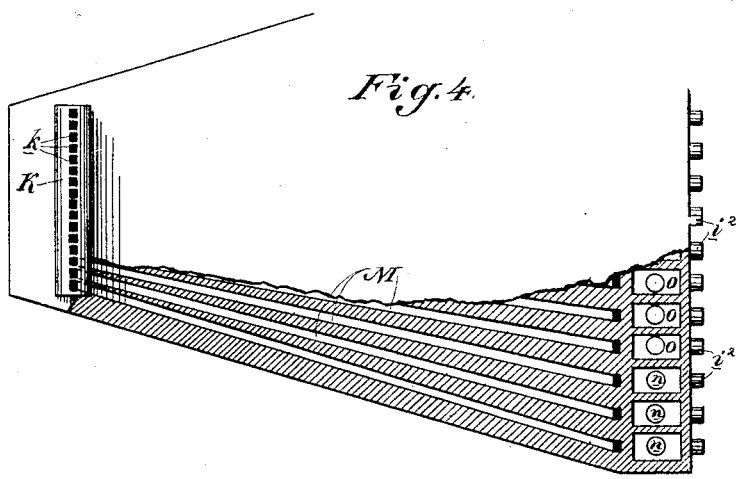
Witnesses,
J. H. Nurse
H. C. Lee.
Inventor,
George F. Wells
By Dewey & Co.
Attys (No Model.) 3 Sheets—Sheet 3.
G. F. WELLS.
AUTOMATIC ORGAN.
No. 462,460. Patented Nov. 3, 1891.
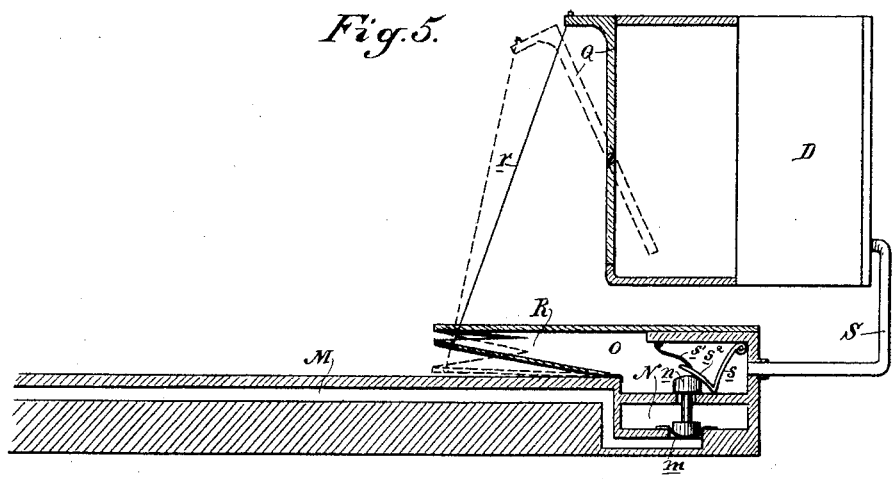
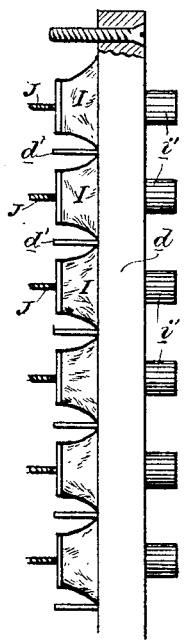
Witnesses:
J. H. Nurse
H. C. Lee.
Inventor,
George F. Wells
By Dewey & Co.
Attys

United States Patent Office.

GEORGE F. WELLS, OF SAN FRANCISCO, CALIFORNIA.

AUTOMATIC ORGAN.

SPECIFICATION forming part of Letters Patent No. 462,460, dated November 3, 1891.

Application filed November 20, 1890. Serial No. 372,078. (No model.)

*To all whom it may concern:*

Be it known that I, GEORGE F. WELLS, a citizen of the United States, residing in the city and county of San Francisco, State of California, have invented an Improvement in Automatic Organs; and I hereby declare the following to be a full, clear, and exact description of the same.

My invention relates to that class of organs using perforated music-paper, and are consequently known as "automatic" organs.

My invention is applicable to pipe-organs and to those organs which, while employing reeds, have, by reason of their peculiar construction, the effect of pipe-organs, and which are known in the trade as "vocalion" organs.

The main object of my invention is to adapt pipe and vocalion organs to be operated by perforated music-paper.

My invention consists, essentially, in the novel pneumatic-valve-operating mechanism, hereinafter fully described, and specifically pointed out in the claims.

My invention also consists, in connection and combination with said valve-operating mechanism, of the means by which the perforated music-paper controls and operates that mechanism, and in other and various details of constructions, all of which will be hereinafter fully described, and specifically pointed out in the claims.

Referring to the accompanying drawings for a more complete explanation of my invention, Figure 1 is a vertical section. Fig. 2 is an enlarged section of one of the pans with its connections. Fig. 3 is an end elevation and section of the chambers O and N. Fig. 4 is a top view of the air-passages from the range to the vacuum-chamber. Fig. 5 is a view of the swell-operating mechanism. Fig. 6 is a top view of the pan-tray with collapsible casings.

As before stated, my invention is applicable to pipe-organs and to those reed-organs which have the effect of pipe-organs; but for the sake of illustration I have herein shown the invention as applied to the latter class of organs, or those which are termed "vocalion."

I have here shown two manuals, though it will be understood that a single manual, or more than two manuals, may be used.

A represents the keys; B, the trackers; C, the pressure-bellows; D, the pans, said pans being connected with the bellows in the usual manner, so that they are supplied with air under pressure. In the front of the pans are the several openings $e$, which communicate with the reed-cells E, in which are located the reeds $e'$, and under which are the qualifying or modifying chambers F.

G are the valves which control the passages $e$ of the reeds, said valves being hung or pivoted at the top at $g$, whereby they swing inwardly in the pan to open the passages, and against said passages to close them.

H are the pull-downs, connected at their lower ends with the trackers in the usual manner, and at their upper ends with the bell-crank levers or jacks $h$, which operate the valves G, all in the usual manner of these instruments.

In the application of my invention to this organ it is not the intention to interfere in any manner with the ordinary operation of the instrument when so desired, and consequently I have shown the essential parts of such an instrument.

The backs of the pans, which are represented by $d$, are called "trays," and are made readily removable.

The essential part of my invention consists, as before stated, in the novel pneumatic device by which the valves G may be operated independently of the usual mechanism in order to adapt the instrument to the purpose intended—namely, of using perforated paper-music. This mechanism is as follows: Upon the inner side of the trays $d$ are arranged a series of separated vertical guide-slats $d'$. In the spaces between these are mounted collapsible casings I, which consist of front pieces joined to the inner surface of the tray by flexible sides and ends, whereby chambers are formed within these casings. Through the front piece of each collapsible casing is made an air-aperture $i$, and from the interior of each casing extends backwardly through the tray an air-pipe $i'$. A suitable connection (represented by J) is made between the front piece of each collapsible casing and the inner surface of each valve G. This connection consists of a cord, which is connected at its inner end with the back of the valve G, and thence extends through the front piece of the collapsible casing and hence down within it, said cord being made adjustable by passing through a small frictional button $j$, whereby it may be adjusted to suit the required connection between the two parts.

To avoid confusion I will at this point describe the operation of the collapsible casings I. In the ordinary operation of the instrument the pressure-bellows C keeps the pan D supplied with air under pressure. Now by operating the keys A the valves G are operated through the trackers, pull-downs, and bell-crank levers, whereby the air passes to the pipes in the case of pipe-organs or to the reed-cells in the case of vocalions. It will be seen from this that the operation is dependent upon the movement of the valves G, and it is to effect this movement independently of the keys that my collapsible casings are intended. When the parts are in a state of rest, and if it be supposed that the exit-pipes $i'$ of the collapsible casings be closed, it will be seen that the air under pressure in the pan D passes through the air-apertures $i$ into the collapsible casings, and the pressure in said casings is then equal to that within the pan, whereby said casings remain in a state of rest and in a distended or expanded condition, due to the normal position of the flexible walls. The front board of said casings extend far enough into the pans to allow, through the connections J, the valves G to remain closed. If now we suppose that any one or more of the exit-pipes $i'$ be suddenly opened the air within said casing or casings will immediately escape, and said casing or casings will suddenly collapse under the pressure within the pan, whereby their front boards will pull back, through the connections J, the valves G. Then by closing the pipes $i'$ the casings again return to their normal expanded condition, the air passing through their apertures $i$ into them. When the casings are collapsed, their front piece bearing against the tray-surfaces closes the exit, and thus prevents wastage of air from the pan. It will thus be seen that the valves G may be operated, and by providing suitable means for controlling the escape or exit pipes $i'$ from the collapsible casings the operation of the valves may be effected. I control these escape-pipes $i'$ by means of the perforated music-paper acting through suitable connections, and I control them also by the keys. In the former case the organ becomes an automatic one, and in the latter the action of the keys when coupled is rendered easier. I have here shown means adapted to these ends.

Into the front board of the instrument is inserted the range K of the usual pattern, having the customary air-passages $k$ in it. Over this range passes the perforated music-paper L, operated by drums $l$, said drums being actuated by a suitable motor, (represented by $l'$,) and which need not be herein described, as any proper motor may be used, said motor transmitting its power by means of a belt $l^2$ to one of the drums below.

Extending into the machine are the series of air-passages M, formed in a suitable manner, as by grooves or channels in a board.

In the inner portion of the machine is a box in which is formed a vacuum-chamber N in the lower portion thereof and a series of air-chambers O in the upper portion thereof over the vacuum-chamber, which extends the whole length of the box. With the vacuum-chamber N separately communicate all the air-passages M, these communications being controlled by upwardly-rising valves $m$, made of suitable material, usually sheep-skin. The chambers O and chamber N communicate by means of ports, which are controlled by puppet-valves $n$, having downwardly-extending stems $n'$, the lower enlarged ends of which lie directly upon the valves $m$. The corresponding escape-pipes $i'$ of the separate pans open into pipes $i^2$, the lower ends of which communicate with the air-chambers O below, one pipe to each air-chamber.

Above the pressure-bellows C and connected and operating therewith is a suction-bellows $c$, from which a pipe $c'$ extends to and communicates with the vacuum-chamber N. This mechanism is substantially similar to that which is employed generally in automatic instruments, the reeds in said instruments being usually placed in the air-chambers O; but to adapt it to and utilize it for my purpose its connections with my valve-operating mechanism lend a novelty to it in this connection and results in a different mode of operation, which is as follows: The suction-bellows $c$ maintains a vacuum within the chamber N, and as long as the air-passages M are closed by the imperforate portion of the music-paper at the range-mouth the valves $m$, controlling these passages, remain down, so that the vacuum can be maintained in the chamber N. The puppet-valves $n$ are also down, both by reason of their own weight and the pressure of the air within the chambers O, which said chambers communicate through the pipes $i^2$, escape-pipes $i'$, and collapsible apertured casings I with the interior of the pans, so that the same pressure is in the chambers O as in the pans. The escapes from the collapsible casings are thus closed within the chambers O by the puppet-valves $m$, and the valves G remain in normal position, closing the passages to the pipes or reeds. Now when the motor is set in operation and the music-paper begins its travel over the range, the passages M are momentarily opened in such succession or simultaneously as the perforations in the music-paper effect. The opening of the passage M causes an inflow of air through it which raises the valve $m$, said valve having no resistance above it, there being a vacuum in chamber N, and this rising of the valve causes it to raise valve $n$, thus opening the communication between the air-chamber O and the vacuum-chamber N. This opens the escape from the collapsible casing I, and said casing operates, as heretofore described, to pull open the valve G. By the travel of the music the passage M is closed again, the air exhausts from the chamber N through the bellows c, the valve m is thereby closed, and the puppet-valve n returns to its seat, closing the chamber O and cutting off the air-escape from the collapsible casing I. Thus it will be seen that the valves G are operated automatically by the traveling perforated music-paper.

In operating an instrument of this character, in the usual manner, where there are two or more manuals, it is very difficult when said manuals are coupled to press down the keys, this difficulty arising from the great pressure within the series of pans against the valves G. I have provided in my instrument for overcoming this difficulty when the keys are being played normally and the music-paper is not in operation.

P is a swinging lever, of which there are a number, one for each key. One end of this lever is forked and embraces the pull-down H, said pull-down having a cross-pin or lug $h'$ which is adapted to come in contact with the end of the lever P when said pull-down is depressed. The other end of the lever is provided with an arm $p$, which extends upwardly, and is adapted when raised to come up under the valve $m$, which controls the vacuum chamber. Now when a key is depressed so as to depress the pull-down H its pin $h'$, coming in contact with the lever P, swings said lever so that its arm $p$ comes up under and raises the valve $m$, which raises valve $n$, and thus effects the result heretofore described. By these means the valve G is operated by the collapsible casing, and this is of great advantage, as heretofore stated, when the manuals are coupled, allowing the operator to press the keys down easily. In order to throw this mechanism out of gear when the instrument is being used automatically, I fulcrum all the levers P upon an eccentric shaft $p'$ extending under them all, said eccentric shaft having a crank-arm $p^2$, which is connected with the coupler-stop on the front of the instrument.

Perforated music-paper as now manufactured has apertures designed to operate the swell of the instrument, so as to give expression to the music. In my instrument I effect the operation of the swell as follows: Q is the balanced swell, and R is the swell-bellows, the upper side of which in this case in made stationary and the lower side movable, said lower side being connected by a pull-down $r$ with the upper end of the balanced swell, whereby it is swung. One or more of the passages M, heretofore described, communicate with the vacuum-chamber N, the communication being controlled, as heretofore, by a valve $m$, said vacuum-chamber communicating with the air-chambers O, said communication being controlled by the puppet-valves $n$, as heretofore, and said air-chambers communicating with the swell-bellows R. A pipe or pipes S lead from the pans D into the air-chambers O, the communication of said pipes with said air-chambers being controlled by swinging valves $s$, controlled by springs $s'$ and having arms $s^2$, which lie directly over the head of the puppet-valves $n$. Now when the proper aperture in the music-paper comes over the range-passage, so as to open the passage M, the valve $m$ is raised, which raises the puppet-valve $n$ in the manner heretofore described, said puppet-valve in rising coming in contact with the arm $s^2$ of the valve $s$, thereby raising said valve and allowing the air from pan D to enter the chamber O, and thus to distend the swell-bellows R, whereby the swell is operated.

Having thus described my invention, what I claim as new, and desire to secure by Letters Patent, is—

1. In an organ having a traveling perforated music-paper, the collapsible casings connected with the valves of the organ, said casings having air-apertures communicating with the pans, and air-exits, in combination with the means for opening and closing said exits, consisting of the vacuum-chamber, the air-passages from the range of the music-paper, the valves $m$, controlling the communication between said passages and the vacuum-chamber, the air-chambers O, communicating with the vacuum-chamber and connected by pipes with the air-exits of the collapsible casings, and the valves $n$, operated by the valves $m$ and controlling the communication between the air-chambers and vacuum-chamber, substantially as herein described.

2. In an organ having a traveling perforated music-paper, the air-pans and the valves therein, in combination with the collapsible casings connected with the valves and having air-apertures communicating with the pans and air-exits, the vacuum-chamber, the suction-bellows connected therewith, the air-passages of the music-paper range, the valves $m$, controlling the communication of said passages with the vacuum-chamber, the air-chambers O, communicating with the vacuum-chamber, the valves $n$, controlling said communication and operated by the valves $m$, and the pipes connecting the air-exits of the collapsible casings with the air-chambers O, substantially as herein described.

3. In an organ, the pans, the valves therein, and the pull-downs forming part of the transmitting mechanism between the keys and the valves, whereby the latter are operated, in combination with the collapsible casings connected with the valves, said casings having air-apertures communicating with the pans and air-exits, and a means controlled by the pull-downs for opening and closing said exits, substantially as and for the purpose herein described.

4. In an organ, the pans, the valves therein, and the pull-downs forming part of the power-transmitting mechanism between the keys and the valves, whereby the latter are operated, in combination with the collapsible casings connected with the valves, said casings having air-apertures communicating with the pans and air-exits, the vacuum-chamber N, the air-chambers O, communicating with said vacuum-chamber, the valve $n$, controlling said communication, the pipes connecting the air-exits of the collapsible casings with the air-chambers, and the pivoted levers P, operated by the pull-downs and having arms for operating the valves $n$, substantially as herein described.

5. In an organ having a traveling perforated music-paper, the combination of the pull-downs for operating the valves, the apertured collapsible casings I, connected with said valves for assisting in their operation, the vacuum-chamber, air-chambers, and connections with the range of the perforated music-paper and with the collapsible casings, the valves controlling said connections, and the levers P, operated by the pull-downs and having arms for operating said valves and the adjustable fulcrum of said levers, whereby they may be thrown into and out of action, substantially as and for the purpose herein described.

6. In an organ having a traveling perforated music-paper, and in combination with its spans, valves, and its music-paper range and passages, the balanced swell and the means for operating it, consisting of the bellows connected with the swell, the vacuum-chamber communicating with the range-passage, the valve $m$, controlling said communication, the air-chamber communicating with the bellows and with the vacuum-chamber, the valve $n$, controlling said last-named communication and operated by the valve $m$, the pipe connecting the pans with the air-chamber, and the valve controlling said connection and operated by the valve $n$, substantially as herein described.

In witness whereof I have hereunto set my hand.

GEORGE F. WELLS.

Witnesses:
S. H. NOURSE,
H. C. LEE.